United States Patent [19]

Suwala

[11] Patent Number: 5,035,829
[45] Date of Patent: Jul. 30, 1991

[54] PAINT REMOVING COMPOSITIONS

[75] Inventor: David W. Suwala, Flanders, N.J.

[73] Assignee: GAF Chemicals Corporation, Wayne, N.J.

[21] Appl. No.: 286,968

[22] Filed: Dec. 20, 1988

Related U.S. Application Data

[62] Division of Ser. No. 21,891, Mar. 4, 1987, Pat. No. 4,812,255.

[51] Int. Cl.$^5$ .......................... C11D 7/08; C11D 7/50; C11D 7/26; C11D 3/26
[52] U.S. Cl. .................................... 252/170; 252/142; 252/143; 252/146; 252/162; 252/174.18; 252/542; 252/DIG. 8
[58] Field of Search ........... 252/142, 143, 146, 174.18, 252/162, 170, DIG. 8, 542

[56] References Cited

U.S. PATENT DOCUMENTS 4,120,810 10/1978 Palmer .......................... 252/DIG. 8
4,749,510  6/1988 Nelson ................................. 252/105

*Primary Examiner*—Paul Lieberman
*Assistant Examiner*—Alexander G. Ghyka
*Attorney, Agent, or Firm*—Jules E. Goldberg; Marilyn J. Maue; Joshua J. Ward

[57] ABSTRACT

Water soluble paint remover compositions for the removal of uncured paint are disclosed which avoid the use of toxic organic solvent, in particular, methylene chloride. The inventive compositions comprise an organic carboxylic acid, N-methyl-2-pyrrolidone, and an alkylene glycol ether. Methods for use of the compositions are also disclosed.

10 Claims, No Drawings

PAINT REMOVING COMPOSITIONS

This is a division of application Ser. No. 021,891, filed Mar. 4, 1987, now U.S. Pat. No. 4,812,255.

BACKGROUND OF THE INVENTION

1. Field of the Invention

The invention relates to novel compositions of matter which are useful for stripping or softening paint and methods for using such compositions. More particularly, the invention concerns paint removal compositions which are water-soluble and environmentally safe.

2. Description of the Prior Art

The term "paint remover" as hereafter applied refers to chemical compositions which can strip or facilitate stripping of coatings, such as, paint, lacquer, varnish, shellac, polyurethane finishes, enamels, and other coatings used to protect substrates and to beautify them. If applied by wiping, a paint remover can also serve to "degloss" a finish so that it will be suitably prepared for application of a new coat of paint. When used on brushes or other coating applicators, some paint removers can remove hardened paint and restore the brush to usable condition.

Chemical paint removers have achieved considerable popularity because they are much easier to use than the non-chemical alternatives of blow torches or power sanders. These chemical paint removers fall into two categories. One category is a caustic based remover which is seldom used in home applications because it is heated and requires dip tanks. This category has a deleterious effect on most kinds of wood, and often dissolves glue holding the furniture together.

The most popular type of paint remover incorporates an organic chemical solvent base. A typical composition of such a paint remover is disclosed in U.S. Pat. No. 2,507,983, methylene chloride constituting 86% by weight of the mixture and methanol usually being added in smaller proportion to solubilize a methylcellulose thickener. Paint removers based on methylene chloride are generally very effective on varnish and alkyd paint. They are less effective on lacquer and latex finishes. Unthickened removers which have high concentrations of methanol and benzene are used for varnish removal. Wax is sometimes added to restrain the rapid evaporation of the organic solvents.

A serious objection to such paint removers is their high degree of toxicity, particularly due to the inhalation of vapors. Another serious objection is that they can burn the skin causing various degrees of dermatitis, depending on the exposure.

A substantial body of literature directed to the extremely hazardous nature of methylene chloride has developed and it is clear that the use of this material in paint removers, while extensive in the past, must be discontinued.

Other hazardous chemicals have commonly been used in paint removers, such as, methanol, benzene, xylene, hydrogen peroxide, phenol and cresols, and the like. All of these materials are highly disadvantageous with respect to the environment or safety. The organic materials all are toxic to various degrees and others of the materials named are so highly corrosive or caustic that they can only be used under very restricted conditions.

One attempt to avoid the presence of the environmentally unsuitable methylene chloride or other organic solvents has been the inclusion in paint removers of N-methyl-2-pyrrolidone. Thus, U.S. Pat. No. 4,128,810 discloses the use of N-methyl-2-pyrrolidone in combination with a mixture of aromatic hydrocarbons having more than 6 carbon atoms. The composition exhibits better safety characteristics, low toxicity, low volatility and does not burn the skin and also operates as a paint remover. However, a major disadvantage of this composition is the fact that it is not water soluble.

A significant problem occurs in the painting of vehicles, e.g., automobiles and the like, wherein the parts for the automobiles are spray-painted in metal spraying booths. The interior of the booths must be cleaned, usually on a daily basis, and the paint on the surfaces of the interior of the booth, which is usually made of metal, removed. The use of a paint removal spray in such a situation is highly advantageous. However, it is understandable that the art is quite reluctant to utilize a paint remover containing the toxic materials outlined above. However, an additional problem is that if one uses a paint remover or stripper which is not water soluble, it is difficult to wash away the softened paint which, itself, of course, is not water soluble. Normally, it is desired, after application of the paint remover and allowing it to stand for a sufficient amount of time to soften the paint, to hose or brush the entire facility down. Paint removers containing the organic materials do not work satisfactorily when the booths are hosed down and are incompletely removed.

Attempts to produce paint removers which are water soluble generally require the presence of highly corrosive materials, such as, alkali metal hydroxides. Typical of such materials is the composition disclosed in U.S. Pat. No. 4,368,082. Clearly, the corrosive nature of such materials not only creates safety hazards, but also can be destructive to the substrate from which the paint is being removed.

SUMMARY OF THE INVENTION

I have discovered a paint removing composition which is highly effective for the removal of a variety of different types of paints and which is environmentally safe, exhibits low toxicity, and furthermore, is water soluble, therefore facilitating easy clean-up. More particularly, the composition of the present invention comprises an organic acid having the formula RCOOH wherein R is hydrogen, lower alkyl having from 1 to 10 carbon atoms, halogen substituted lower alkyl having from 1 to 10 carbon atoms, hydroxy, alkyl and cyclic alkyl having from 4 to 6 carbon atoms and alkali metal salts thereof; an alkylene glycol ether, particularly those wherein the alkylene group has 2 or 3 carbon atoms; and a compound selected from the group consisting of five member ring lactones and lactams. Each of these components should be present in an amount such that the overall composition is effective in paint removal.

The composition of the present invention is particularly effective in paint removing in the spray-painting of vehicle parts, because after application of the paint remover, the interior of the spray booth utilized for the paint application may be hosed down with hot or cold water.

DESCRIPTION OF THE PREFERRED EMBODIMENTS

Organic acids suitable for use in the present invention include the lower alkyl carboxylic acids and most preferred are formic acid, acetic acid, or mixtures thereof.

Other acids which are suitable include chloroacetic, glycolic, and naphthenic acids. These acids are highly effective in the present composition, are readily available and relatively inexpensive. Also, alkali metal salts of these acids may be used.

The second important component of the present invention is an alkylene glycol ether. Included in this group are those ethers wherein the alkylene group has 2 or atoms. Preferred are tripopylneglyco monomethyl ether, dipropyleneglycol monomethyl ether and propylene glycol monomethyl ether. Mixtures of these may also be used.

The third essential component of the composition is a five membered ring lactone or lactam. Preferred in this group is N-methyl-2-pyrrolidone, gamma-butyrolactone, 2-pyrrolidone, vinyl-pyrrolidone, and mixtures thereof.

The amount of each of the essential components in the final composition may vary within a certain range. What is important, however, is that each be present in an amount sufficient to provide the overall composition with effectiveness in paint removal. Typically, the composition may contain from about 5 to 35, and preferably, from 10 to 30 weight percent of the organic acid, from 30 to 65, and preferably, from 40 to 60 weight percent of the glycol ether, and from 10 to 50, and preferably, from 15 to 40 weight percent of the lactone or lactam.

The composition of the present invention may also optionally contain conventional wetting agents, corrosion inhibitors and thickeners.

Surface active agents may also be utilized in the composition. Thus, since the paint removal composition of the invention is water soluble, is amenable to flushing off the treated surface with water which may be applied by a brush or hose, surface active agents may be used to maintain any non-water soluble components of the mixture, e.g., the paint, in the form of an emulsion during flushing from the surface. Surface active agents of particular interest in compositions according to the present invention are those of a non-ionic nature which may, if desired, be of a biodegradable nature. Agents of the non-ionic type include:

1. The polyethylene oxide condensates of alkylphenols, e.g., the condensation products of alkylphenols or dialkyl phenols wherein the alkyl group contains from about 6 to about 12 carbon atoms in either branched chain or particularly straight chain configuration, for example, octyl cresol, octyl phenol or nonyl phenol, with ethylene oxide, the said ethylene oxide being present in amounts equal to about 5 to about 25 moles of ethylene oxide per mole of alkylphenol.

2. Partial esters formed by the reaction of fatty acids, for example of about 8 to about 18 carbon atoms, with poly-hydric alcohols, for example, glycerol, glycols, such as, mono-, di-, tetra- and hexaethyleneglycol, sorbitan, etc; and similar compounds formed by the direct addition of varying molar ratios of ethylene oxide to the hydroxy group of fatty acids.

3. The condensation products of fatty acid partial esters with ethylene oxide, such as, fatty acid esters of polyoxyethylene sorbitan and sorbitol containing from about 3 to about 80 oxyethylene units per molecule and containing fatty acid groups having from about 8 to about 18 carbon atoms.

4. The condensation products of aliphatic alcohols having from about 8 to about 18 carbon atoms in either straight chain or branched chain configuration, for example, oleyl or cetyl alcohol, with ethylene oxide, the said ethylene oxide being present in amounts equal to about 30 to about 60 moles of ethylene oxide per mole of alcohol.

Of these classes of non-ionic surface active agents, the condensates of ethylene oxide with alkl phenols are of especial interest. Preferred surface active agents of this class are those condensates wherein 1 mole of the alkyl phenol is condensed with from 5 to 15 moles of etylene oxide, particularly when the alkyl phenol is octyl or especially nonyl phenol Examples of surface active agents of this type which may be used are those supplied under the following trade names:

| Name | Approximate Chemical Constitution |
| --- | --- |
| Antaron ® | monocarboxyl cocoimidazoline |
| Igepon ® | alkyl sulfonamides |
| Alipal ® | ammonium salt of ethoxylate sulfate |
| Igepal ® | ethoxylated alkylphenol |
| Emulphogene ® | tridecyloxypoly(ethyleneoxy)ethanol |
| Span 40 ® | sorbitan monopalmitate |
| Parasyn ® | hydrogenated castor oil |
| Miraniol ® | cocoamphodipropionate |
| Trydet ® | polyethoxylated fatty acid ester. |

Normally, if surface active agents are included in the composition, they are included in an amount from about 1 to 8 weight percent, and preferably, from about 2 to 4 weight percent.

Corrosion inhibitors may also be included in the inventive composition. Such corrosion inhibitors are conventional. If such corrosion inhibitors are included in the inventive composition, they are normally present in an amount from about 0.5 to 2 weight percent, and preferably, from about 0.9 to 1.1 weight percent. Typical corrosion inhibitors include Rodine ® from Amchem, Ambler, Pa.

Thickeners may also be included in the inventive composition. The preferred thickeners or gelling agents cellulose derivatives having the property of both water and organic solvent solubility. Cellulose derivatives of this type which are of particular interest are those ether derivatives containing etherifying groups selected from hydroxyalkyl groups and. groups derived therefrom, such etherifying groups containing preferably up to about 5 or 6 carbon atoms. The gelling agent may also comprise cellulose ether derivatives which, in addition to etherifying groups selected from hydroxyalkyl groups and groups derived therefrom, contain other types of etherifying groups, especially small alkyl groups of, for example, one or two carbon atoms. However, such etherifying groups generally confer properties upon the cellulose derivative which are less acceptable for the present purpose, and the gelling agent is therefore conveniently substantially restricted to cellulose ether derivatives containing etherifying groups selected from hydroxyalkyl groups and groups derived therefrom.

Etherifying groups consisting of or derived from hydroxyalkyl groups containing up to 5 carbon atoms, particularly, 2, 3 or 4 carbon atoms, are of a special value. The hydroxypropyl celluloses, for example, have been found to be of particular value in giving a substantially transparent gel system with a suitable solvent system and in imparting quite adequate thickening and film-forming properties in their own right without the need of any other agents for these purposes. Conveniently, the hydroxypropyl group in such celluloses is derived from isopropanol rather than n-propanol but a number of variations in structure are possible even when this is the case. Thus, not all of the free hydroxy groups of the cellulose need necessarily be substituted and, if desired, the hydroxy groups of certain hydroxypropyl groups may, in turn, be substituted by a further hydroxypropyl group (as for example, in the Klucel materials described below). Hydroxypropyl celluloses employed in compositions according to the present invention conveniently have molecular weights in the range from about 50,000 to about 1,000,000, preferably from about 800,000 to 1,000,000.

One form of hydroxypropyl cellulose which has been used with advantage is marketed under the trade name Klucel H and is based upon repeating units containing a pair of anhydroglucose groups in which 5 of the free hydroxyl groups are etherified, the units being of the type:

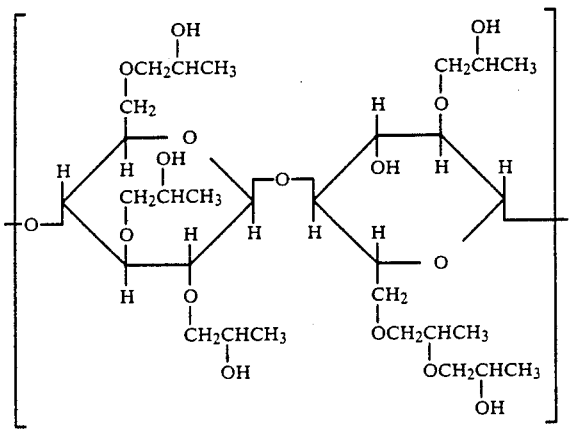

Klucel H has a similar chemical structure to Klucel MS 3.0, which may also be used, but is of higher molecular weight, and possesses particular advantages in terms of the viscosity of its solutions. Thus, a 1% solution of Klucel H in water has a viscosity in the range from 1,500 to 2,500 units and in ethanol the range is 1,000 to 2,500 units while solutions of Klucel MS 3.0, particularly in ethanol, have a lower viscosity. The property of possessing a substantially similar viscosity in organic solvent and aqueous solutions is a valuable one for gelling agents used in compositions according to the present invention. The proportion of gelling agent required in the compositions in order to give good gels, depends in part on the molecular weight of the gelling agent used, the usual range being from 0.25% to 10% or even 15%, 18% or 20%. Thus, for example, with the usual proportion of gelling agent of from about 0.25% or 0.5% upwards is suitable for high molecular weight materials and of from about 3% upwards is suitable for low molecular weight materials. For high molecular weight materials, for example of molecular weights of 800,000 to 1,000,000, a proportion of above 1.5% is preferably avoided as it leads to a gel of too great a viscosity. With low molecular weight materials, larger proportions may be used before such a position is reached and, if the molecular weight is low enough, amounts of up to 10% or even 20% or more may be used. It will be appreciated, however, that the use of a smaller amount of material of higher molecular weight is generally to be preferred.

A particularly preferred composition is about 15 to 40 weight percent N-methyl-2-pyrrolidone, about 40 to 60 weight percent tripropyleneglycol monomethylether and 10 to 30 weight percent acid, with the acid component being composed of about one to two parts of formic acid and about four to three parts of acetic acid.

The amount of thickener utilize is usually from about 0.5 to 2 weight percent, with 0.8 to 1.1 weight percent being preferred.

In the following examples, a variety of compositions were tested for their paint removing ability. These tests were carried out by first physically formulating the compositions, i.e., by mixing all of the ingredients together except for the thickener which is thereafter added slowly while stirring. The pH and viscosity of each of formulation was then measured.

Each such composition was then subjected to a SAG test using a Leneta SAG meter by applying the composition to a black varnished test card. The card was placed in a vertical position for 15 seconds. The SAG number indicates the thickness of the film of the specific formulation which will not flow down one millimeter. The purpose of this test is to provide an indication of the tendency of a given stripper composition to flow downwardly when applied to a vertical surface, as on the walls of a spray booth.

The paint stripping ability of the compositions was measured as follows:

Cold rolled steel coupons (1×3 inches, available from Q-Panel) were painted with white or blue automotive paint (DuPont melamine formaldehyde acrylic paint). The paint was applied by spraying onto both sides of the metal coupon. The amount of paint applied to each coupon wa 0.7 mils thick.

The paint was not allowed to cure. Within seven days after application of the paint (normally within four days to insure against curing) the painted coupon was immersed into the test formulation, withdrawn, and placed against a vertical surface.

At various time periods after this placement, i.e., 5 or 15 minutes, the stripper and loosened paint were removed from the coupon by rinsing it under a stream of tap water. The gloss of the coupon was then measured utilizing a Gardner gloss meter.

An unpainted coupon gives a gloss reading of greater than 100. Any paint residue remaining on the coupon reduces this reading and is an indication of the amount of paint remaining which corresponds to the relative effectiveness of the stripper. After 24 hours, the gloss of the coupon was measured again. This reading indicates loss in reflectivity of the metal due to rusting.

TABLE 1

| Test No. | NMP | TPM | PM | FORMIC ACID | XYLENE | METHYL-NAPHTA-LENE | THICKENER KLUCEL H ® | SURFACE ACT. AGENT IGEPAL ® CO-710 | CORROSSION INHIBITOR RODINE ® | TEA |
|---|---|---|---|---|---|---|---|---|---|---|
| 1 | 40.0 | 30.0 |  | 25.0 | 5.0 |  | 0.8 | 2.0 | 0.5 | 2.0 |
| 2 | 40.0 |  | 30.0 | 25.0 | 5.0 |  | 0.8 | 2.0 | 0.5 | 2.0 |
| 3 | 40.0 | 30.0 |  | 25.0 |  | 5.0 | 0.8 | 2.0 | 0.5 | 2.0 |
| 4 | 40.0 |  | 30.0 | 25.0 |  | 5.0 | 0.8 | 2.0 | 0.5 | 2.0 |
| 5 | 45.0 | 30.0 |  | 25.0 |  |  | 0.8 | 2.0 | 0.5 | 2.0 |

TABLE 1-continued

| Test No. | NMP | TPM | PM | FORMIC ACID | XYLENE | METHYL-NAPHTA-LENE | THICKENER KLUCEL H ® | SURFACE ACT. AGENT IGEPAL ® CO-710 | CORROSSION INHIBITOR RODINE ® | TEA |
|---|---|---|---|---|---|---|---|---|---|---|
| 6 | 30.0 | 45.0 | | 25.0 | | | 0.8 | 2.0 | 0.5 | 2.0 |

NMP is N-methyl-2-pyrrolidone
TPM is tripropyleneglycol monomethyl ether
PM is propyleneglycol monomethyl ether
TEA is triethanol amine

TABLE 2

| Test No. | pH | BROOKFIELD VISCOSITY | SAG | WHITE GLOSS 15 Min. | WHITE GLOSS 5 Min. | BLUE GLOSS |
|---|---|---|---|---|---|---|
| 1 | 2.4 | 4,300 | 20.0 | 94.0 | | 100.0 |
| 2 | 2.6 | 1,900 | 16.0 | 93.5 | | 100.0 |
| 3 | 2.4 | 3,500 | 20.0 | 97.0 | | 100.0 |
| 4 | 2.5 | 2,000 | 18.0 | 80.0 | | 100.0 |
| 5 | 2.4 | 4,100 | 20.0 | | 92.5 | |
| 6 | 2.0 | 4,400 | 30.0 | | 90.0 | |

The data in Tables 1 and 2 shows that the paint removing properties of compositions in accordance with the present invention are at least equivalent to or better than those compositions which contain organic solvents, such as, xylene or naphthalene. Thus, the organic solvents are known to improve the penetration of a composition into the paint. The gloss measurements after the stripping composition had remained on the painted coupon for 15 minutes are shown. However, with the compositions in accordance with the present invention, i.e., test No. 5 and 6, wherein neither xylene nor naphthalene was utilized, superior paint stripping properties were achieved only after five minutes of contact.

A series of experiments was carried out to study the effect of acetic acid versus formic acid in terms of paint removal. The compositions used and the results obtained are set forth in Tables 3 and 4. As can be seen therein, acetic acid is as effective as formic acid in stripping paint. This is important because acetic acid is somewhat less corrosive than formic acid. Note that the gloss with TAL-STRIP ® (a commercial methylene chloride containing paint stripper) is halved because of the extensive rusting of the surface after the use of the stripper.

An additional series of experiments was carried out using varying amounts of NMP and glycol ether components. Also, compositions containing sodium formed rather than formic acid or acetic acid were utilized. The compositions used in these experiments are shown in Table 3 and the results obtained are shown in Table 4.

TABLE 3

SPRAY BOOTH STRIPPERS MELAMINE FORMALDEHYDE ACRYLATE PAINTS FORMULATIONS

| No. | NMP | TPM | PM | ACID FORMIC | ACID ACETIC | SODIUM FORMATE | KLUCEL H ® | IGEPAL ® CO-710 | RODINE ® | TEA |
|---|---|---|---|---|---|---|---|---|---|---|
| 7 | 35.0 | 40.0 | | 25.0 | | | 0.8 | 2.0 | 0.5 | 2.0 |
| 8 | 40.0 | 35.0 | | 25.0 | | | 0.8 | 2.0 | 0.5 | 2.0 |
| 9 | 45.0 | 30.0 | | 25.0 | | | 0.8 | 2.0 | 0.5 | 2.0 |
| 10 | 50.0 | 25.0 | | 25.0 | | | 0.8 | 2.0 | 0.5 | 2.0 |
| 11 | 55.0 | 20.0 | | 25.0 | | | 0.8 | 2.0 | 0.5 | 2.0 |
| 12 | 32.0 | 42.0 | | 26.0 | | | 0.9 | 2.0 | 1.5 | 2.0 |
| 13 | 42.0 | 36.0 | | 22.0 | | | 0.9 | 2.0 | 1.5 | 2.0 |
| 14 | 42.0 | 32.0 | | 26.0 | | | 0.9 | 2.0 | 1.5 | 2.0 |
| 15 | 44.0 | 32.0 | | 24.0 | | | 0.9 | 2.0 | 1.5 | 2.0 |
| 16 | 46.0 | 32.0 | | 22.0 | | | 0.9 | 2.0 | 1.5 | 2.0 |
| 17 | 44.0 | 30.0 | | 26.0 | | | 0.9 | 2.0 | 1.5 | 2.0 |
| 18 | 52.0 | 22.0 | | 26.0 | | | 0.9 | 2.0 | 1.5 | 2.0 |
| 19 | 32.0 | | 42.0 | | 26.0 | | 0.9 | 2.0 | 1.5 | 2.0 |
| 20 | 42.0 | | 36.0 | | 22.0 | | 0.9 | 2.0 | 1.5 | 2.0 |
| 21 | 42.0 | | 32.0 | | 26.0 | | 0.9 | 2.0 | 1.5 | 2.0 |
| 22 | 44.0 | | 32.0 | | 24.0 | | 0.9 | 2.0 | 1.5 | 2.0 |
| 23 | 46.0 | | 32.0 | | 22.0 | | 0.9 | 2.0 | 1.5 | 2.0 |
| 24 | 44.0 | | 30.0 | | 26.0 | | 0.9 | 2.0 | 2.5 | 2.0 |
| 25 | 52.0 | | 22.0 | | 26.0 | | 0.9 | 2.0 | 1.5 | 2.0 |
| 26 | 52.0 | 22.0 | | 26.0 | | | 1.0 | 2.0 | 1.5 | 3.0 |
| 27 | 42.0 | 32.0 | | 26.0 | | | 1.0 | 2.0 | 2.0 | 1.0 |
| 28 | 42.0 | 32.0 | | 13.0 | | 13.0 | 1.0 | 2.0 | 2.0 | 3.0 |
| 29 | 52.0 | 22.0 | | 13.0 | | 13.0 | 0.9 | 2.0 | 2.0 | 3.0 |
| 30 | 42.0 | 32.0 | | 26.0 | | | 0.9 | 2.0 | 1.5 | 3.0 |
| 31 | 52.0 | 22.0 | | 13.0 | | 13.0 | 1.0 | 2.0 | 1.5 | 1.0 |
| 32 | 52.0 | 22.0 | | 26.0 | | | 0.9 | 2.0 | 2.0 | 1.0 |
| 33 | 42.0 | 32.0 | | 13.0 | | 13.0 | 0.9 | 2.0 | 1.5 | 1.0 |
| 34 | TAL-STRIP ® | | | | | | | | | |

TABLE 4

SPRAY BOOTH STRIPPERS MELAMINE FORMALDEHYDE ACRYLICATE PAINTTS PERFORMANCE PROPERTIES

| No. | pH | BROOKFIELD VISCOSITY | SAG | GLOSS 15 MIN. | BLUE GLOSS | 24 HRS. GLOSS |
|---|---|---|---|---|---|---|
| 7 | 2.3 | 5,500 | 20.0 | 10.0 | | 10.0 |
| 8 | 2.4 | 5,500 | 25.0 | 30.0 | | 24.0 |

TABLE 4-continued

SPRAY BOOTH STRIPPERS MELAMINE FORMALDEHYDE ACRYLICATE PAINTTS PERFORMANCE PROPERTIES

| No. | pH | BROOKFIELD VISCOSITY | SAG | GLOSS 15 MIN. | BLUE GLOSS | 24 HRS. GLOSS |
|---|---|---|---|---|---|---|
| 9 | 2.6 | 6,800 | 25.0 | 5.0 | | 5.0 |
| 10 | 2.7 | 4,900 | 20.0 | 6.0 | | 6.0 |
| 11 | 2.8 | 5,100 | 25.0 | 7.5 | | 7.0 |
| 12 | 2.2 | 7,100 | 25.0 | 5.0 | 59.0 | 6.0 |
| 13 | 2.9 | 5,250 | 25.0 | 6.5 | 78.0 | 5.0 |
| 14 | 2.7 | 6,400 | 25.0 | 84.0 | 63.5 | 81.0 |
| 15 | 2.7 | 5,100 | 30.0 | 16.5 | 76.0 | 13.5 |
| 16 | 2.8 | 6,100 | 25.0 | 5.0 | 88.5 | 5.0 |
| 17 | 2.6 | 5,950 | 30.0 | 24.0 | 100.0 | 27.5 |
| 18 | 2.6 | 5,100 | 25.0 | 95.0 | 82.0 | 100.0 |
| 19 | 4.4 | 1,850 | 20.0 | 59.0 | 100.0 | 57.5 |
| 20 | 4.8 | 2,650 | 25.0 | 13.5 | 100.0 | 18.0 |
| 21 | 4.5 | 3,000 | 20.0 | 45.0 | 100.0 | 51.0 |
| 22 | 4.8 | 1,400 | 18.0 | 5.5 | 100.0 | 5.0 |
| 23 | 4.8 | 2,500 | 20.0 | 5.0 | 100.0 | 5.0 |
| 24 | 4.5 | 2,200 | 20.0 | 52.5 | 100.0 | 57.5 |
| 25 | 4.8 | 1,800 | 20.0 | 11.0 | 100.0 | 8.5 |
| 26 | 2.7 | 2,500 | 25.0 | 85.0 | | 82.5 |
| 27 | 2.4 | 4,100 | 20.0 | 83.0 | | 78.5 |
| 28 | 4.6 | 4,200 | 30.0 | 58.5 | | 64.5 |
| 29 | 4.7 | 3,700 | 18.0 | 17.5 | | 18.5 |
| 30 | 2.6 | 4,200 | 25.0 | 64.5 | | 63.5 |
| 31 | 4.6 | 4,700 | 25.0 | 67.5 | | 65.0 |
| 32 | 2.6 | 2,700 | 25.0 | 82.0 | | 87.5 |
| 33 | 4.3 | 4,550 | 30.0 | 100.0 | | 100.0 |
| 34 | TAL-STRIP ® | | | 52.5 | | 25.0 |

TABLE 5

STRIPPER FORMULATIONS

| No. | NMP | PM | ACID FORMIC | ACID ACETIC | CHLORO-ACETIC | GLYCOLIC | KLUCEL ® | IGEPAL ® CO-710 | RODINE ® | TEA |
|---|---|---|---|---|---|---|---|---|---|---|
| 34 | 44.0 | 30.0 | 26.0 | | | | 0.9 | 2.0 | 1.5 | 2.0 |
| 35 | 44.0 | 30.0 | | 26.0 | | | 0.9 | 2.0 | 1.5 | 2.0 |
| 36 | 44.0 | 30.0 | | 23.0 | 3.0 | | 0.9 | 2.0 | 1.5 | 2.0 |
| 37 | 44.0 | 30.0 | | | | 26.0 | 0.9 | 2.0 | 1.5 | 2.0 |
| 38 | 44.0 | 30.0 | 22.0 | (+4.0 NaFORMATE) | | | 0.9 | 2.0 | 1.5 | 2.0 |

TABLE 6

PERFORMANCE PROPERTIES

| No. | pH | BROOKFIELD VISCOSITY | SAG | GLOSS 15 MIN. |
|---|---|---|---|---|
| 34 | 2.75 | 2,400 | 18.0 | 100.85 |
| 35 | 5.20 | 2,200 | 18.0 | 100.00 |
| 36 | 4.20 | 2,350 | 20.0 | 100.00 |
| 37 | 2.65 | 3,700 | 20.0 | 100.00 |
| 38 | 3.70 | 2,800 | 20.0 | 100.00 |

The results in Tables 5 and 6 show that effective paint stripping results can be obtained utilizing a variety of content ranges of each of the three required components of the inventive composition. In addition, this data shows that sodium formate may be utilized in place of a portion of the formic acid to be produce a composition which strips the paint effectively. The formulation obtained with the sodium formate composition provides a higher pH composition with a somewhat decreased tendency for rusting of cold rolled steel.

I claim:

1. A water soluble paint remover composition for removing uncured paint consisting essentially of:
   a) from about 5 to 35 weight percent of an organic acid having the formula RCOOH wherein R is hydrogen, lower alkyl having from 1 to lo carbon atoms, halogen substituted lower alkyl having from 1 to 10 carbon atoms, hydroxy alkyl and cyclic alkyl having from 4 to 6 carbon atoms, and alkali metals salt of said acids;
   b) from about 30 to 65 weight percent of an alkylene glycol ether; and
   c) from about 10 to 50 weight percent of a five member ring lactone or lactam.

2. The composition of claim 1 wherein the amount of organic acid is from about 10 to 30 weight percent, the amount of glycol ether is from about 40 to 60 weight percent, and the amount of lactone or lactam is from about 15 to 40 weight percent.

3. The composition of claim 1 lactone or lactam is selected from the group consisting of N-methyl-2-pyrrolidone, gamma-butyrolactone, 2-pyrrolidone, vinylpyrrolidone, and mixtures thereof.

4. The composition of claim 1 which further comprises thickeners, surface active agents, corrosion inhibitors, and mixtures thereof.

5. The composition of claim 1 wherein the organic acid is selected from the group consisting of formic, acetic, chloroacetic, glycolic, naphthenic, and mixtures thereof.

6. The composition of claim 1 which further contains an alkali metal salt of said organic acid.

7. The composition of claim 1 wherein the organic acid is selected from the group consisting of formic and acetic.

8. The composition of claim 1 wherein the alkylene glycol ether has 2 or 3 carbon atoms in the alkylene portion.

9. The composition of claim 1 wherein the alkylene glycol ether is selected from the group consisting of tripropyleneglycol, monomethyl ether, dipropyleneglycol monomethyl ether, and propylene glycol monomethyl ether.

10. A water soluble paint remover composition consisting essentially of:
   a) from about 15 to 40 weight percent N-methyl-2-pyrrolidone;
   b) from about 40 to 60 weight percent tripropyleneglycol monomethyl ether; and
   c) from about 10 to 30 weight percent of an organic acid mixture composed of about one to two parts formic acid and about four to three parts acetic acid.

* * * * *